United States Patent [19]

Feldtkeller

[11] Patent Number: 5,034,873
[45] Date of Patent: Jul. 23, 1991

[54] CIRCUIT CONFIGURATION FOR A FIXED-FREQUENCY BLOCKING OSCILLATOR CONVERTER SWITCHING POWER SUPPLY

[75] Inventor: Martin Feldtkeller, Munich, Fed. Rep. of Germany

[73] Assignee: Siemens Aktiengesellschaft, Munich, Fed. Rep. of Germany

[21] Appl. No.: 591,137

[22] Filed: Oct. 1, 1990

[30] Foreign Application Priority Data

Sep. 29, 1988 [EP] European Pat. Off. ......... 89118088.7

[51] Int. Cl.$^5$ ........................................... H02M 3/335
[52] U.S. Cl. ........................................ 363/21; 363/97
[58] Field of Search ....................................... 363/18–21, 363/95, 97, 49

[56] References Cited

U.S. PATENT DOCUMENTS

| | | | |
|---|---|---|---|
| 4,564,820 | 1/1986 | Peruth et al. | 363/21 X |
| 4,593,347 | 6/1986 | Peruth et al. | 363/21 |
| 4,597,036 | 6/1986 | Paulik et al. | 363/21 |
| 4,648,016 | 3/1987 | Peruth et al. | 363/21 |
| 4,740,879 | 4/1988 | Peruth | 363/21 X |
| 4,740,880 | 4/1988 | Peruth | 363/21 X |
| 4,924,369 | 5/1990 | Varadi | 363/21 |
| 4,964,028 | 10/1990 | Spataro | 363/21 X |
| 4,975,823 | 12/1990 | Rilly et al. | 363/21 X |

Primary Examiner—Steven L. Stephan
Assistant Examiner—Emanuel Todd Voeltz
Attorney, Agent, or Firm—Herbert L. Lerner; Laurence A. Greenberg

[57] ABSTRACT

A circuit configuration for a fixed frequency blocking oscillator converter switching power supply includes an electric switch. A transformer has a primary winding connected in series with the electric switch in the circuit of a voltage source outputting a direct voltage with a first algebraic sign, the switch being alternatingly switched on in a first operating phase and switched off in a second operating phase, and a secondary winding having a voltage from which a rectified output voltage is attained. An integratable trigger circuit for pulse-width-modulated switching of the switch has an oscillator emitting a voltage oscillating periodically between upper and lower peak values, and a pulse width modulator connected between the oscillator and the switch for switching the switch as a function of the periodically oscillating oscillator voltage. The periodically oscillating oscillator voltage varies at a speed being at least intermittently proportional to the direct voltage in a period segment in which its variation over time has the same algebraic sign as the direct voltage.

17 Claims, 4 Drawing Sheets

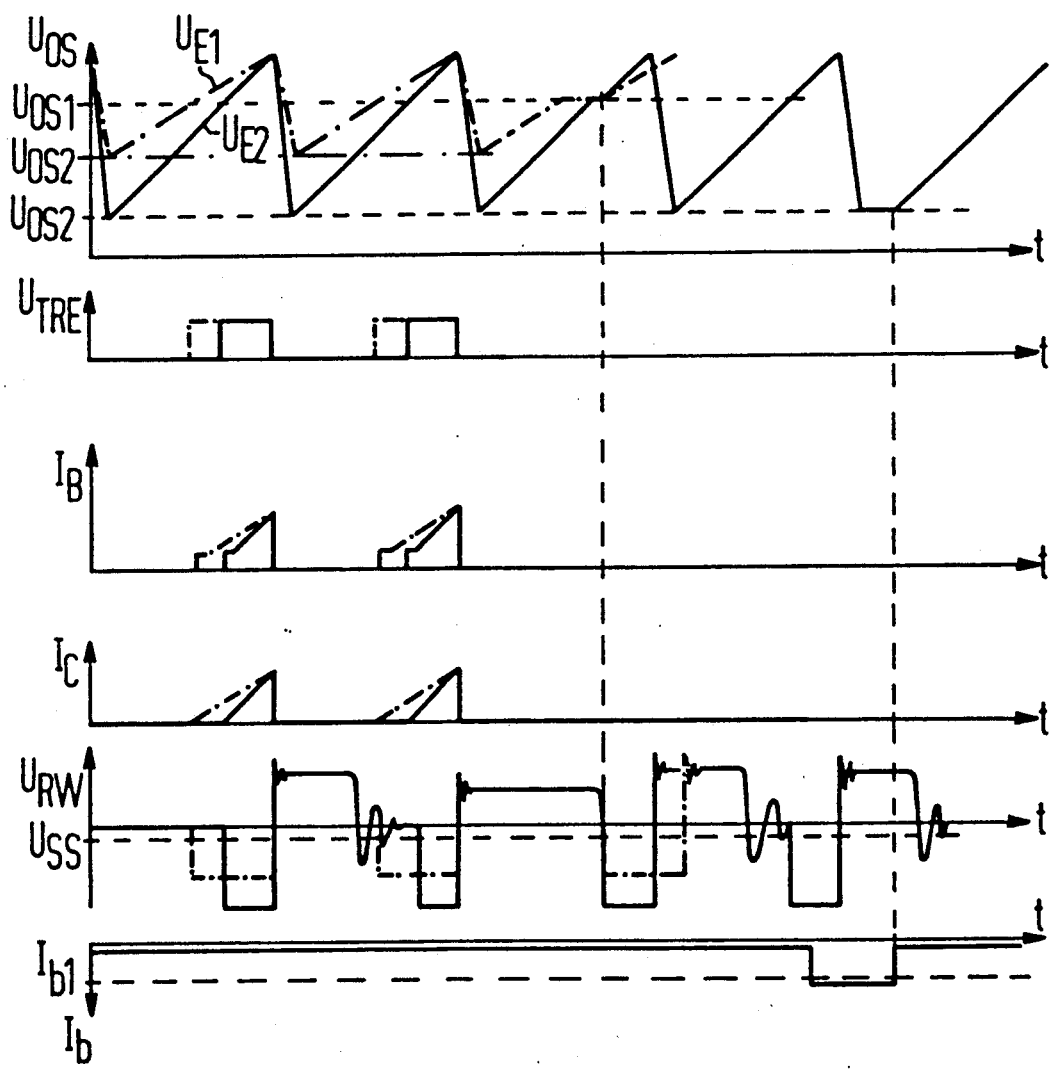

CIRCUIT CONFIGURATION FOR A FIXED-FREQUENCY BLOCKING OSCILLATOR CONVERTER SWITCHING POWER SUPPLY

BACKGROUND OF THE INVENTION

The invention relates to a circuit configuration for a fixed frequency blocking oscillator converter switching power supply, including a transformer having a primary winding in series with an electric switch in the circuit of a voltage source that outputs a direct voltage (input voltage) with a first algebraic sign, the switch being alternatingly switched on in a first operating phase (flux phase) and switched off in a second operating phase (blocking phase), and a secondary winding having a voltage (secondary winding voltage) from which a rectified output voltage is attained; and an integratable trigger circuit for pulse-width-modulated switching of the switch, having an oscillator emitting a voltage (oscillator signal) oscillating periodically between an upper and a lower peak value, and a pulse width modulator switching the switch as a function of the oscillator signal.

Fixed-frequency blocking oscillator converters or flyback converters with such circuits are known in a number of versions. For instance, reference is made to the monograph "Schaltnetzteile" [Switching Power Supplies] edited by J. Wüstehube and published by Expert-Verlag in 1979, in particular chapter 3 thereof.

Blocking oscillator converters operating with fixed frequency generally require somewhat more expensive wiring than free-oscillating blocking oscillator converters. However, they are preferred whenever the instant of the current transition from the primary to the secondary side, which is the moment at which the highest-energy HF disturbances occur, is to be synchronized with some other operation. Such synchronization is recommended, for instance, for particularly high-power television switching power supplies or switch power packs, in which interference suppression is not readily successful. If the high-frequency noise pulses are shifted to the horizontal flyback of the TV set, then they remain invisible.

In a typical blocking oscillator converter having a fixed operating frequency, an integrated control circuit (trigger component) generates a synchronizable oscillator signal, forms a control signal from the deviation of the load voltage from a set-point value, and switches a switching transistor synchronously with the oscillator, in such a way that the collector peak current of the switching transistor is determined by the control signal. These functions are generally realized as follows (in this connection, reference is made to the publication TLE, December, 1988, No. 539, pp. 27–31, for instance): The oscillator receives two fixed switching thresholds; an applied synchronizing pulse shifts the upper switching threshold somewhat downward and as a result raises the oscillator frequency to the frequency of the synchronizing signal. The discharging pulse of the oscillator starts a trigger pulse for the switching transistor, upon which a base current proportional to its collector current is then imposed, in order to avoid oversaturation. The information on the collector current is attained from a measurement voltage, which is picked up either at an emitter resistor or at a resistor capacitor element connected parallel to the primary-side power element. If this measurement voltage exceeds a threshold value defined by the control signal, the trigger component terminates the trigger pulse.

In such a circuit, the collector current simulation requires a number of external components and a separate component connection. A further consideration is that the switching power supply can only be synchronized at considerable expense, for instance by including an extensive PLL switching circuit.

SUMMARY OF THE INVENTION

It is accordingly an object of the invention to provide a circuit configuration for a fixed-frequency blocking oscillator converter switching power supply, which overcomes the hereinafore-mentioned disadvantages of the heretofore-known devices of this general type, which requires minimal external wiring, which makes do with relatively few IC connections, and which permits simple synchronization and is thus attractive from the standpoint of expense as well, which is a primary consideration in switching power supplies for entertainment units and systems.

With the foregoing and other objects in view there is provided, in accordance with the invention, a circuit configuration for a fixed frequency blocking oscillator converter switching power supply, comprising an electric switch; a transformer having a primary winding connected in series with the electric switch in the circuit of a voltage source outputting a direct voltage with a first algebraic sign, the switch being alternatingly switched on in a first operating phase and switched off in a second operating phase, and a secondary winding having a voltage from which a rectified output voltage is attained; and an integratable trigger circuit for pulse-width-modulated switching of the switch having an oscillator emitting a voltage oscillating periodically between upper and lower peak values, and a pulse width modulator connected between the oscillator and the switch for switching the switch as a function of the periodically oscillating oscillator voltage; the periodically oscillating oscillator voltage varying at a speed being at least intermittently proportional to the direct voltage in a period segment in which its variation over time has the same algebraic sign as the direct voltage.

In accordance with another feature of the invention, the direct voltage is an input voltage, the first operating phase is a flux phase, the second operating phase is a blocking phase, the voltage of the secondary winding is a secondary winding voltage, the periodically oscillating oscillator voltage is an oscillator signal, and the period segment is a control edge.

The input voltage $U_E$ of the switching power supply as a rule is a rectified, smoothed mains voltage having positive values.

If the voltage rise speed of the oscillator signal $U_{OS}$ is proportional to the input voltage when the input voltage is positive, as provided in accordance with the invention, then the signal automatically receives the necessary information on the collector current of the switching transistor. The collector current in fact likewise rises proportionally to the input voltage, given a fixed predetermined transformer inductance. In this sense, this current no longer needs to be detected separately.

However, the oscillator signal furnishes the desired information only if the transformer does not change its inductance. This is assured if a provision is made which ensures that the switch is not switched on again after each blocking phase until the transformer has given up all of its magnetic energy.

The desired $U_{OS}$ behavior ensues, for instance, whenever the difference between the upper and low peak value, that is the signal amplitude, is made proportional to the input voltage and the duration of the segments in which $U_{OS} \sim U_E$ is supposed to apply, is kept constant. In a preferred exemplary embodiment, the duty cycle of the switch is determined both by a control threshold representing the output voltage and by the input voltage, in the following way: An oscillator frequency independent of the input voltage is specified; the upper peak value is kept constant; the lower peak value is reduced with increasing input voltage; and a control threshold located between the two peak values and decreasing with increasing output voltage is generated. The switch is switched on whenever the oscillator signal exceeds the control threshold, and is then switched off again once the oscillator signal reaches the upper peak value. The duty cycle thus decreases with increasing $U_E$ value and/or increasing output voltage $U_A$ values. At the same time, in the flux phase, the difference between the oscillator signal and the control threshold is proportional to the collector current of the switching transistor at all times.

In accordance with a further feature of the invention, the input voltage is positive, and the period segment of the oscillator signal between the lower and upper peak values is the control edge.

In accordance with an added feature of the invention, the difference between the upper and lower peak values is proportional to the input voltage, and the intervals between successive control edges are constant.

In accordance with an additional feature of the invention, the upper peak value is fixed and the lower peak value is variable.

In accordance with yet another feature of the invention, there is provided a resistor receiving the input voltage, and a capacitor connected to ground, the oscillator receiving a voltage picked up between the resistor and the capacitor for defining an oscillation frequency.

In accordance with yet a further feature of the invention, the voltage picked up between the resistor and the capacitor is a first oscillator input voltage, the lower peak value is formed by subtraction of a second oscillator input voltage proportional to the input voltage from the upper peak value, and the oscillator includes a first comparator having a positive input receiving the first oscillator input voltage, a negative input at the level of the upper peak value, and an output; a second comparator having a positive input at the level of the lower peak value, a negative input at the level of the first oscillator input voltage, and an output; a flip-flop having a set input connected to the output of the first comparator, a reset input connected to the output of the second comparator, and an output connected to the pulse width modulator, and a transistor circuit being connected to the output of the flip-flop and discharging the capacitor with a current intensity proportional to the input voltage once the first oscillator input voltage has attained the upper peak value.

In accordance with yet an added feature of the invention, the pulse width modulator switches on the switch once the oscillator signal has passed through a control threshold upon passage of the control edge, and switches off the switch once the oscillator signal has attained a peak value located at the end of the control edge.

In accordance with yet an additional feature of the invention, the flip-flop is a first flip-flop, and the pulse width modulator includes a third comparator having a positive input at the level of the first oscillator input voltage, a negative input at the level of the control threshold, and an output; a second, reset-dominant flip-flop having a set input connected to the output of the third comparator, a reset input connected to the output of the first flip-flop and an output; and a driver for the switch being connected between the output of the second flip-flop and the switch.

In accordance with again another feature of the invention, the control threshold is derived from the secondary winding voltage.

In accordance with again a further feature of the invention, there is provided a demagnetization monitor preventing the switch from being switched on by outputting an appropriate enabling signal until the transformer is completely demagnetized in the blocking phase, the oscillator signal being stopped at the control threshold upon passage of the control edge if and as long as no enabling signal has been emitted.

The circuit of a blocking oscillator converter typically already includes a demagnetization monitor, which does not enable a trigger pulse for the switch until the transformer is completely demagnetized.

In accordance with again an added feature of the invention, there is provided a first AND gate having an inverting input receiving the enabling signal of the demagnetization monitor, a non-inverting receiving the control threshold, and an output connected to the set input of the second reset-dominant flip-flop; and a first voltage regulator having a fourth comparator, a second AND gate and a second transistor circuit, the fourth comparator having a positive input at the level of the first oscillator input voltage, a negative input connected to the control threshold, and an output, the second AND gate having a first input connected to the output of the fourth comparator and a second input receiving the enabling signal, and an output, and the second transistor circuit being controlled by the output of the second AND gate for maintaining the first oscillator input voltage at the control threshold if and as long as no enabling signal is present.

If the high-energy HF noise of the switching power supply is to be shifted to the horizontal flyback of a TV set, then it is recommended that a synchronizing signal be generated during the horizontal flyback and that the oscillator signal at the beginning of the control edge be kept constant at the applicable peak value, as long as the synchronizing signal is present.

Therefore, in accordance with again an additional feature of the invention, the oscillator signal is synchronized by means of a synchronizing pulse, and the oscillator signal is kept at its peak value located at the beginning of the control edge if and as long as the synchronizing signal is present.

In accordance with still another feature of the invention, there is provided a third, reset-dominant flip-flop having a reset input receiving the synchronizing signal, a set input connected to the output of the first flip-flop, and an output; and a second voltage regulator having a fifth comparator, a third AND gate, and a third transistor circuit; the fifth comparator having a positive input at the level of the first oscillator input voltage, a negative input at the level of the peak value located at the beginning of the control edge, and an output; the third AND gate having a first input connected to the output of the fifth comparator, a second input connected to the output for receiving the signal of the third, reset-dominant flip-flop, and an output; and the third transistor circuit being switched by the output of the third AND gate for keeping the first oscillator input voltage at the peak value located at the beginning of the control edge whenever a current pulse is present.

In accordance with still a further feature of the invention, the input voltage is a rectified and filtered mains voltage.

In accordance with a concomitant feature of the invention, the circuit configuration is a blocking oscillator converter switching power supply of a television set with digital signal processing or monitors.

Other features which are considered as characteristic for the invention are set forth in the appended claims.

Although the invention is illustrated and described herein as embodied in a circuit configuration for a fixed-frequency blocking oscillator converter switching power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 4 is a pulse diagram in which an oscillator signal $U_{OS}$, a driver signal $U_T$ for a switching transistor, its collector current $I_C$, a feedback voltage $U_{RK}$ and a synchronizing pulse $U_{Sync}$ are plotted as functions of time t.

Figure 1:
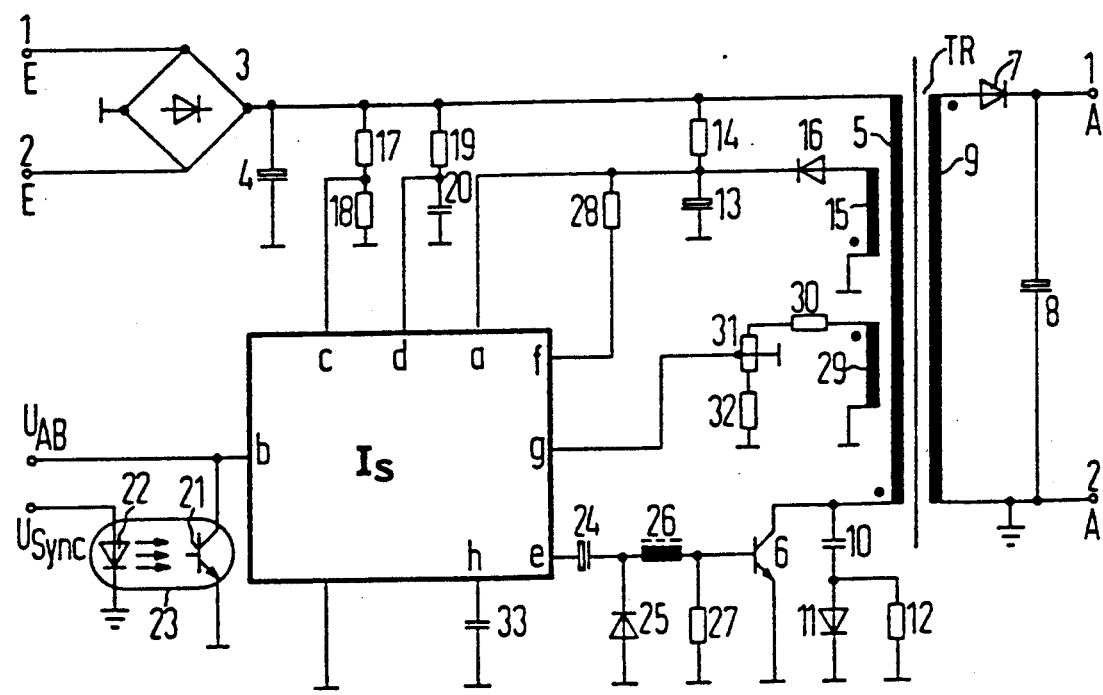
FIG. 1 is a schematic and block circuit diagram of an exemplary embodiment of the invention, in which a trigger component is shown merely as a block.

For the sake of simplicity, circuit elements that are not absolutely necessary for a comprehension of the invention have been left out or have only been schematically shown in the drawings.

Figure 2:
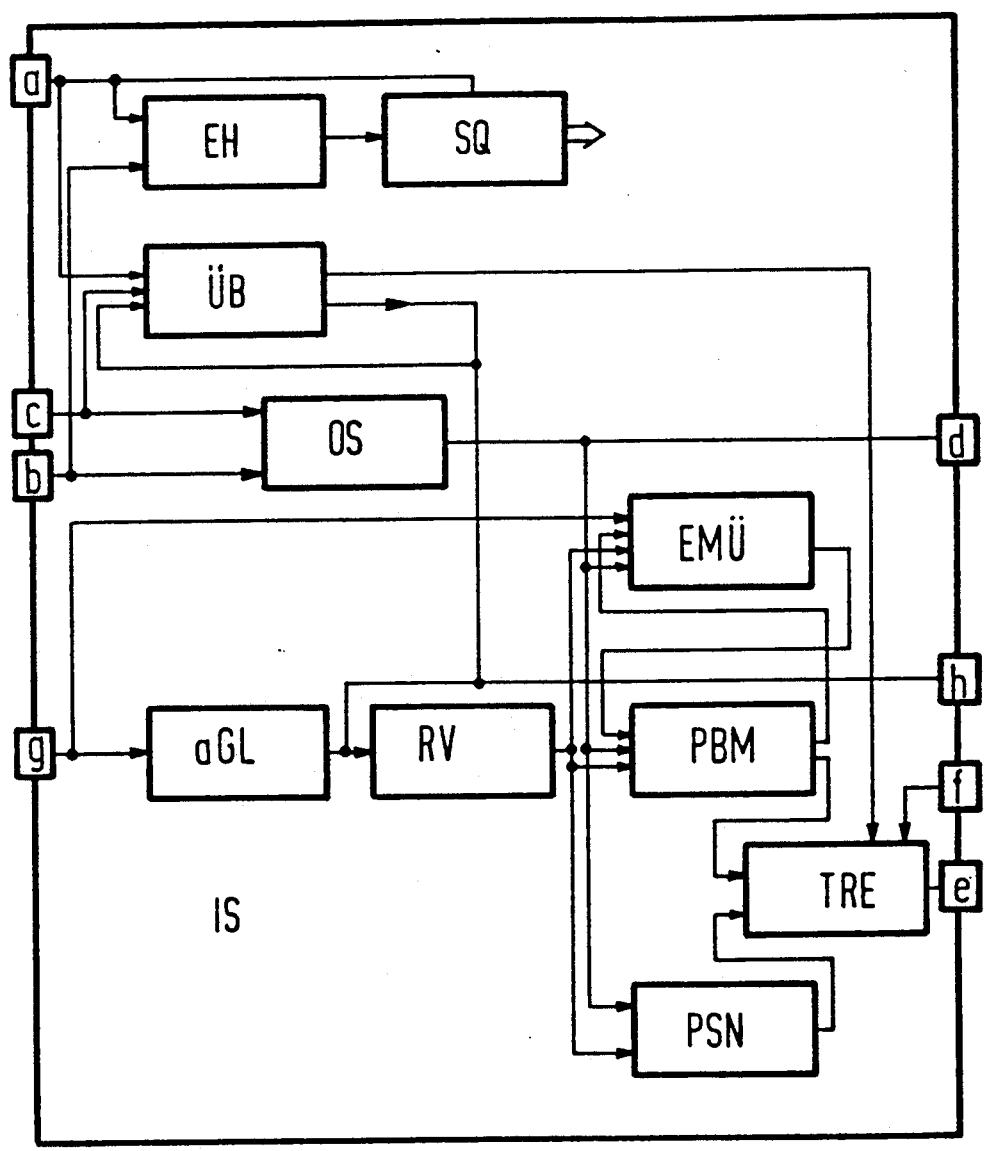
FIG. 2 is a block circuit diagram of the trigger component of the exemplary embodiment of FIG. 1, including individual circuit blocks thereof.

Referring now in detail to the figures of the drawing, in which elements corresponding to one another are identified by the same reference numerals, and first, particularly, to FIGS. 1 and 2 thereof, there is seen a switching power supply which is a high-power blocking oscillator converter, that is particularly suitable for television sets having digital signal processing and monitors.

The blocking oscillator converter which is shown changes a mains voltage picked up at primary-side terminals $1_E$ and $2_E$ into a number of lower, stabilized output voltages, each of which can be picked up at a pair of secondary-side terminals. Of these secondary-side terminals, only terminals $1_A$ and $2_A$ are shown, which furnish an output voltage $U_A$. The mains voltage is rectified in a rectifier 3, smoothed in a capacitor 4, and then carried to ground through a primary or feed winding 5 of a transformer TR and the operating path of an electric switch in the from of a bipolar transistor 6. The output voltage is attained by rectification at a diode 7 and filtering at a capacitor 8 of a transformer voltage that is derived from a secondary winding 9. A protection circuit which is parallel to the operating path of the transistor 6 includes a capacitor 10 in series with a diode 11 and a resistor 12 connected to the diode which assures that the transistor will remain out of danger under all operating conditions.

The switching transistor 6 is triggered with pulse width modulation by an integrated control circuit or trigger component IS that has nine connections and is shown in further detail in FIG. 2. The trigger component is supplied with current through a connection or pin a. If a further connection or pin b is unwired, then a circuit block EH (turn-on hysteresis) in the trigger component switches on a voltage source SQ that furnishes a reference voltage $U_{ref}$ and thus switches on all of the other functions of the trigger component, whenever the supply voltage $U_a$ exceeds a value $U_{aE}$, and switches them off again whenever the supply voltage drops below a value $U_{aA}$ (that is, $U_{aA}<U_{aE}$). With the reference voltage source off, the current consumption of the entire trigger component is so low (approximately 1 mA) that a capacitor 13 connected parallel to the trigger component can be charged directly from the rectified mains voltage to a value $U_{aE}$, through a high-impedance resistor 14. During normal operation, the current supply is effected from a separate supply winding 15 of the transformer TR through a diode 16. If the pin b is connected to ground, then the reference voltage source is not switched even when $U_a>U_{aE}$. In order to prevent the voltage at the capacitor 13 from becoming overly high, it is limited by a rise of the current consumption above $U_{aE}$. As soon as the connection of the pin b to ground is broken, the trigger component switches on. The waiting time for charging of the capacitor 13 is then dispensed with. A description of this turn-on hysteresis and how it can be attained with circuitry is provided in further detail in the co-pending application Ser. No. 07/591,135, entitled Circuit Configuration for a Switching Power Supply, having the same inventor and the same filing date as the instant application.

The trigger component also includes an oscillator OS, which generates a sawtooth oscillator signal $U_{OS}$ with an amplitude that is proportional to the rectified mains voltage $U_E$. An upper peak value $U_{OS1}$ (equals $U_{ref}$) is set fixedly, whereas a low peak value $U_{OS2}$ is variable, as seen in FIG. 4. The information on the mains voltage is received by the oscillator through a further IC connection or pin c, in the form of a $U_E$-proportional voltage signal $U_C$ picked up between resistors 17 and 18. In order to determine the oscillator frequency, a resistor capacitor element (RC), which is constructed of a resistor 19 of the oscillator and a capacitor 20 and is located between the input voltage and ground is provided. In this way, a voltage $U_d$ located between the resistor and the capacitor is supplied to the oscillator through a further IC connection or pin d. The trigger component assures that the capacitor is discharged with a current intensity that is proportional to the input voltage, or in other words during a period of time independent of $U_E$. Since the resistor 19 is directly at the $U_E$ level, the charge time of the capacitor 20 is also independent of $U_E$, and the result is that the oscillator frequency is unaffected by the input voltage.

The pin b is a current input for wiring to an optical coupler 23, including a phototransistor 21 and a light-emitting diode 22. The phototransistor 21 of the optical coupler 23 acts upon a virtual voltage source, in order to attain the required rapidity even with a relatively inexpensive optical coupler. If the current $I_b$ drawn from the trigger component at the pin b exceeds a limit value $I_{b1}$ whenever the oscillator signal reaches it lower peak value $U_{OS2}$, then the oscillator signal remains at this value until the current being drawn drops below the value $I_{b1}$ again, as seen in FIG. 4. During the remaining period of the oscillator signal, the pin b has no effect on the oscillator OS. If the optical coupler draws current continuously from the pin b, then the oscillator ceases to oscillate. The switching power supply is thus disconnectable through a suitable shutoff signal $U_{AB}$ at the pin b and does not switch on again until the optical coupler becomes currentless. The diode 22 of the optical coupler 23 is acted upon by a synchronizing signal $U_{sync}$, which makes the phototransistor conducting during the horizontal flyback.

The trigger component also includes a pulse width modulator PBM which generates trigger pulses, and a driver TRE which is connected to the base of the switching transistor 6 through a pin e and a pulse-forming network and switches it to the trigger pulses received by the pulse width modulator. The pulse-forming network includes a series capacitor 24, a shunt diode 25, a series inductor 26 and a shunt resistor 27. The transistor 6 is switched on when the oscillator signal exceeds the voltage value of an internal control threshold $U_{RS}$, and shuts off when the oscillator signal reaches its upper peak value $U_{OS1}$ seen in FIG. 4. Thus the turn-on instant shifts as a function of the control signal and of the mains voltage, whereas in contrast the shutoff instant remains unchanged.

Since both the voltage rise speed of the oscillator signal and the current rise speed of the collector current of the switching transistor are proportional to the mains voltage, the spacing between the oscillator signal and the control threshold is equivalent to the collector current. However, the prerequisite for this is that the energy has flowed completely out of the transformer before the switching transistor turns on.

A further circuit block PSN (primary current simulation) simulates the collector current from the difference between the oscillator signal and the control threshold, and supplies this information to the driver TRE, which imposes a current $I_B$ that is proportional to the collector current $I_C$ upon the base of the switching transistor 6.

The current intensity at which the switching transistor is operated can be adjusted with a resistor 28, which is connected from the pin a to the driver through a further IC connection or pin f. In order to switch the transistor on quickly and in a defined manner, the imposed base current $I_B$ rises in square form at the onset of a trigger pulse, as seen in FIG. 4. Once the oscillator signal has reached its upper peak value $U_{OS1}$, the driver connects the pin e to ground. Then a current flows out of the base of the switching transistor during the storage time thereof, and the decay speed of the current is determined by the series inductor or impedor 26 located upstream of the transistor base. At the end of the storage time, the collector current drops in a very brief time. The current flux changes over first to the capacitor 10 and then from the primary side to the secondary side of the transformer. The resultant high-frequency noises drop into the synchronizing pulse as seen in FIG. 4. Since the switching power supply is synchronized with the horizontal flyback of the TV set, the television picture remains undisturbed.

The output voltage is detected and controlled through a further or control winding 29, which is well coupled to the secondary winding 9. The signal or feedback voltage emitted by the control winding reaches an active rectifier aGL through a calibratable voltage divider formed of resistors 30, 31 and 32 and a further IC connection or pin g. This rectifier generates control information from the voltage applied during the blocking phase. To this end, it reduces the charge of a variable capacitor 33 connected to a separate IC connection or pin h whenever the applied voltage is greater than a set-point value, and increases the charge at voltage values below the set-point value. During the flux phase, it does not change the charge state. The voltage of the control capacitor corrected by the active rectifier is fed to a control amplifier RV, which inverts and limits the control information present at the pin h, in order to generate the control threshold $U_{RS}$ for the pulse width modulator PBM.

The active rectifier aGL varies its characteristic with the voltage value of the control threshold. If the control threshold is high, the pulse width modulator PBM emits short pulses. The pulses decoupled at the control winding are likewise narrow. In order to enable correct detection of the amplitude of the pulses, the active rectifier functions as a peak value rectifier. If the control threshold is low, then the pulse width modulator emits wide pulses. The pulses at the control winding are likewise wide, because of the high transmitted power, but have high-frequency means for average value rectification. For further detail on the active rectifier, reference is made to co-pending application Ser. No. 07/591,146 listing M. Feldtkeller and R. Dangschat as inventors, having the same filing date as the instant application and being entitled Circuit Configuration for a Controlled Blocking Oscillator Converter Switching Power Supply.

A current source additionally provided in the trigger component continuously charges the variable capacitor with a very low current of approximately 1 μA. Once the reference voltage source switches on, this current generates a ramp at the variable capacitor that slowly widens the pulses emitted by the pulse width modulator. This provides for a soft start of the switching power supply.

In order to enable the use of the primary current simulation described above, the blocking oscillator converter operates in intermittent three-phase current operation, in which the transformer completely emits all of its magnetic energy to the load during the blocking phase. In the event of an overload on the output side, or a short circuit, and during the oscillation buildup process, the demagnetization of the transformer takes longer than the blocking phase specified by the oscillator. In such a case, a further circuit block EMÜ (demagnetization monitor) stops the oscillator signal upon the passage of its control edge at the value $U_{RS}$, until the transformer is completely demagnetized. The criterion for the demagnetization is a negative control winding voltage $U_{RW}$ seen in FIG. 4.

The demagnetization monitoring can be perturbed by parasitic intrusions of its measurement signal: firstly, by high-frequency oscillations at the beginning of the blocking phase, known as transformer ringing. These disturbances can bring about briefly negative voltages at the control winding before the transformer is demagnetized. Accordingly, the demagnetizing monitor fades out the transformer ringing, within a time interval that is derived from the oscillator signal. In the oscillation buildup process, this time interval extends over one-half of an oscillator period, whereas in steady-state operation, it extends over the trailing edge of the oscillator signal. The changeover takes place when the voltage at the pin a exceeds 80% of the set-point value for the first time. Further details on this fadeout time, which is dependent on the load voltage, are found in co-pending application Ser. No. 07/591,139, No. GR 89 P 1885), having the same inventor and the same filing date as the instant application and being entitled Circuit Configuration for a Blocking Oscillator Converter Switching Power Supply.

Secondly, the output voltage can reverse its polarity whenever a short circuit with an inductive component suddenly occurs on the output side. The polarity reversal also acts through the transformer upon the control winding whenever the transformer is not yet demagnetized. However, the negative peak value that the voltage at the control winding can attain upon a short circuit is lower than the negative peak value at the end of the demagnetization phase. The latter peak value is proportional to the instantaneous output voltage of the switching power supply. The demagnetization monitor is constructed in such a way that during the oscillation buildup process, it shifts the switching threshold in the negative direction from a very slight positive value. The process is controlled by the ramp generated at the variable capacitor. The extent with which the switching threshold is shifted can be defined by the resistance level of the voltage divider. If there is a short circuit at the output, the voltage at the pin g no longer attains the switching threshold, and the switching power supply immediately ceases to oscillate. It cannot start over again until there is a soft start. If a short circuit prevails on the secondary side during the oscillation buildup, then the negative peak value at the end of the demagnetization phase does not rise to the extent by which the switching threshold of the demagnetization monitor shifts. The switching power supply then breaks off the starting attempt immediately. Further details of this demagnetization monitor can be found in co-pending application Ser. No. 07/591,136, having the same inventor and the same filing date as the instant application and being entitled Circuit Configuration for a Blocking Oscillator Converter Switching Power Supply.

The output voltages of the switching power supply cannot run up if there is an interruption or a short circuit in the control circuit, since the control and demagnetization monitoring take place over the same signal route. If the signal for the demagnetization monitor is absent, the switching power supply cannot oscillate.

Finally, the trigger component IS also includes a block ÜB (monitoring), which does not allow new trigger pulses and discharges the variable capacitor whenever one of the following critical conditions occurs: mains undervoltage (brown-out) or overvoltage, overly low supply voltage of the trigger component, excessively high chip temperature, and overload. The overload protection responds whenever the voltage fed back to the pin g does not attain the set-point value until the 10 μA charge current has charged the variable capacitor 33 up to a critical voltage. The response of a protective function remains stored until the block EH switches off the reference voltage source SQ. Since the trigger component is no longer supplied through the supply winding 15, the component discharges the capacitor 13 to the voltage $U_{aA}$ through the component's own current consumption. With the reference voltage source shutoff, the capacitor 13 charges again through the resistor 14 up to the voltage $U_{aE}$. The component thus periodically samples the protection condition.

Figure 3:
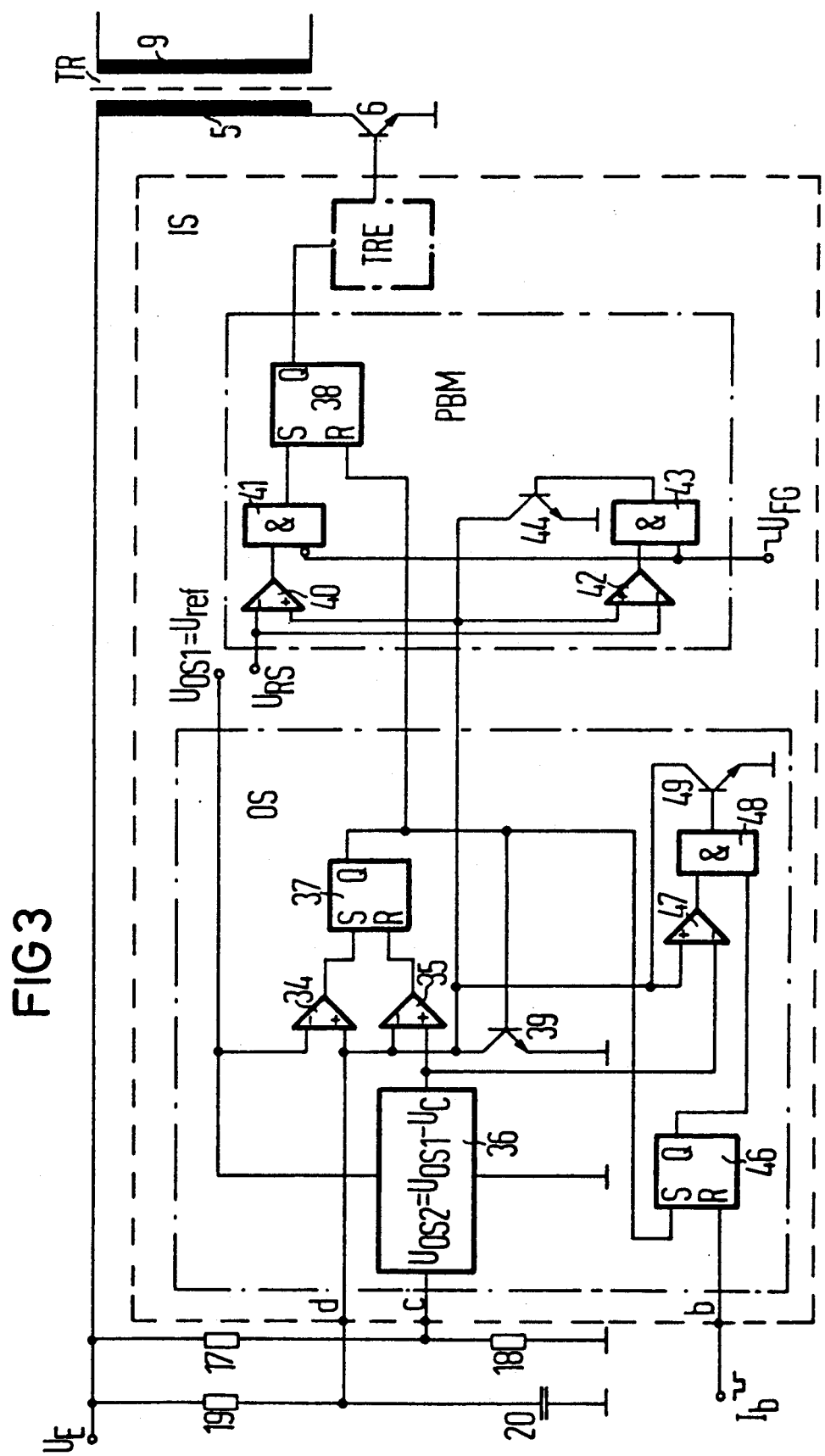
FIG. 3 is a schematic and block circuit diagram showing essential parts of the oscillator and pulse width modulator circuit blocks in greater detail.

FIG. 3 shows the switching means with which the oscillator OS provided according to the invention is achieved.

A first comparator 34 has a negative input connected to the level of the reference voltage $U_{ref}$, which equals $U_{OS1}$. The positive input of the comparator 34 receives the voltage present at the pin d, which is the first oscillator input voltage $U_d$. This voltage is also carried to the negative input of a second comparator 35. The positive input of that comparator is at a voltage level $U_{OS2}$, which is formed in a subtraction element 36 by subtraction of the second oscillator input voltage $U_c$ present at the pin c from the reference voltage.

The outputs of the comparators 34, 35 are carried to respective set and reset inputs of a flip-flop 37 having an output which acts upon the reset input of a first reset-dominant flip-flop 38. The positive input of the first comparator 34, like the negative input of the second comparator 35, is connected in series with the operating path of a transistor 39 that is connected to ground. The base of the transistor 39 is controlled by the output of the flip-flop 37. The transistor represents a transistor circuit that in actuality is somewhat more complicated and is constructed in such a way that it discharges the capacitor 20 with a discharge current intensity proportional to the rectified mains voltage, in response to an appropriate signal of the flip-flop 37.

The effect of the logic described above is that whenever the voltage $U_d$ drawn from the RC element exceeds the value $U_{OS1}$, the driver receives a logical "0", $U_d$ decreases by the widening of the transistor 39, and with dropping $U_d$ values, the "0" is initially maintained at the driver. If $U_d$ drops below the value $U_{OS2}$, then the transistor 39 is blocked, so that $U_d$ rises again.

In order to ensure that the driver will not exceed a logical "1" (and correspondingly generate a trigger pulse), firstly until $U_d$ has passed a control threshold $U_{RS}$ with its leading edge, and secondly until the transformer TR is fully demagnetized, the pulse width modulator PBM includes a third comparator 40. The negative input of the comparator 40 is at the $U_{RS}$ level, its positive input is supplied with the voltage $U_d$, and its output leads to a non-inverting input of a first AND gate 41. An inverting input of the AND gate 41 is acted upon by the enabling signal $U_{FG}$ of the demagnetization monitor EMÜ, and the output of the AND gate 41 leads to the set input of the reset-dominant flip-flop 38. Accordingly, the flip-flop 38 emits a logical "1" only when the flip-flop 37 furnishes a logical "0" and the first AND gate 41 simultaneously generates a logical "1", in other words only when the enabling signal of the demagnetization monitor is present and $U_d > U_{RS}$.

As long as no enabling signal is present, the rising $U_d$ is kept at the $U_{RS}$ level. This is effected by means of a voltage regulator having a fourth comparator 42, a second AND gate 43 and a circuit represented by a transistor 44. In this regulator, $U_d$ and $U_{RS}$ are respectively carried to the positive and negative inputs of the fourth comparator 42. The comparator and the output of the demagnetization monitor EMÜ are each carried to a respective input of the second AND gate 43, which has an output controlling the transistor 44. If the enabling signal is absent, this transistor is made conducting, whereas it is blocked whenever the enabling signal is present and exceeds the value $U_{RS}$.

In order to synchronize the oscillator signal with the horizontal flyback, the synchronizing signal $U_{Sync}$ that coincides with the horizontal flyback is generated and fed in the form of the current $I_b$ through the pin b to the reset input of a second reset-dominant flip-flop 46. The set input of the flip-flop 46 is acted upon by the output signal of the flip-flop 37. The output of the flip-flop 46 leads to a further voltage regulator, which is similar in structure to the voltage regulator acted upon by the enabling signal. In further detail, the regulator includes a fifth comparator 47, which subtracts $U_{OS2}$ from $U_d$ and sends the difference to a third AND gate 48. The gate further receives the output signal of the flip-flop 46 and its output side controls a hold circuit having a transistor 47. If a synchronizing signal is applied, the transistor 49 is conducting whenever $U_d$ is seeking to rise again after the blocking of the transistor 39. If $U_{Sync}$ is absent, the transistor is blocked. The oscillator frequency thus adapts to a lower frequency of the synchronizing signal.

If the transformer is demagnetized before the oscillator signal has attained the control threshold, then the switching power supply operates at a fixed frequency, whereas otherwise it is free-oscillating. Accordingly, free-oscillating operation occurs during the oscillation buildup of the switching power supply and when there is a short circuit on the output side.

The connections described above between the oscillator signal $U_{OS}$ which equals $U_d$, the trigger pulses $U_{TRE}$, the base current $I_B$, the collector current $I_C$, the voltage at the control winding $U_{RW}$ and the current $I_b$ at the pin b are shown, once again in a somewhat simplified form, in FIG. 4, to which reference has already been repeatedly made. The curves drawn in solid lines apply to the case of a relatively high input voltage $U_{E1}$, and the dot-dash curves apply to the case of a relatively low input voltage $U_{E2}$. It can be seen that the oscillator signal in the leading edge is stopped at the control threshold $U_{RS}$ until the control winding voltage has passed through a negative switching threshold USS, and remains at the lower peak value as long as a synchronizing pulse is present.

The invention is not limited merely to the exemplary embodiment that is shown. It is entirely conceivable for the $U_E$-dependent voltage rise speed of the oscillator signal to be achieved with a fixed lower peak value and a variable upper peak value. In that case, however, it would be somewhat more expensive to synchronize the HF interference with the horizontal flyback. It is moreover also possible to operate the switching power supply with a negative input voltage. In that case, the trailing edge of the oscillator signal should be used to determine the trigger pulses for the switch.

I claim:

1. Circuit configuration for a fixed frequency blocking oscillator converter switching power supply, comprising:
   1) a switching transistor having a collector-emitter path and a collector current;
   2) a transformer having
      a) a primary winding connected in series with said collector-emitter path of said switching transistor in the circuit of a voltage source outputting a direct voltage with a first algebraic sign, said switching transistor being alternatingly switched on in a first operating phase and switched off in a second operating phase, and
      b) a secondary winding having a voltage from which a rectified output voltage is attained; and
   3) an integratable trigger circuit for pulse-width-modulated switching of said switching transistor having
      a) an oscillator emitting a voltage oscillating periodically between upper and lower peak values, and
      b) a pulse width modulator connected between said oscillator and said switching transistor for switching said switching transistor as a function of the periodically oscillating oscillator voltage;
      c) the periodically oscillating oscillator voltage varying at a speed being at least intermittently proportional to the direct voltage in a period segment in which its variation over time has the same algebraic sign as the direct voltage, and
      d) said integratable trigger circuit including means for deriving a signal from the period segment in which its variation over time has the same algebraic sign as the direct voltage, said signal corresponding to the strength of said collector current.

2. Circuit configuration according to claim 1, wherein the direct voltage is an input voltage, the first operating phase is a flux phase, the second operating phase is a blocking phase, the voltage of the secondary winding is a secondary winding voltage, the periodically oscillating oscillator voltage is an oscillator signal, and the period segment is a control edge.

3. Circuit configuration according to claim 2, wherein the input voltage is positive, and the period segment of the oscillator signal between the lower and upper peak values is the control edge.

4. Circuit configuration according to claim 2, wherein the difference between the upper and lower peak values is proportional to the input voltage, and the intervals between successive control edges are constant.

5. Circuit configuration according to claim 2, wherein the upper peak value is fixed and the lower peak value is variable.

6. Circuit configuration according to claim 2, including a resistor receiving the input voltage, and a capacitor connected to ground, said oscillator receiving a voltage picked up between said resistor and said capacitor for defining an oscillation frequency.

7. Circuit configuration for a fixed frequency blocking oscillator converter switching power supply, comprising:
   1) an electric switch;
   2) a transformer having
      a) a primary winding connected in series with said electric switch in the circuit of a voltage source outputting a direct input voltage with a first algebraic sign, said switch being alternatingly switched on in a flux phase and switched off in a blocking phase, and
      b) a secondary winding having a secondary winding voltage from which a rectified output voltage is attained; and
   3) an integratable trigger circuit for pulse-width-modulated switching of said switch having
      a) an oscillator emitting an oscillator signal in the form of a voltage oscillating periodically between upper and lower peak values, and b) a pulse width modulator connected between said oscillator and said switch for switching said switch as a function of the periodically oscillating oscillator voltage;

c) the periodically oscillating oscillator voltage varying at a speed being at least intermittently proportional to the direct voltage in a control edge defined as a period segment in which its variation over time has the same algebraic sign as the direct voltage;

4) a resistor receiving the input voltage, and a capacitor connected to ground, said oscillator receiving a voltage picked up between said resistor and said capacitor for defining an oscillation frequency;

wherein the voltage picked up between said resistor and said capacitor is a first oscillator input voltage, the lower peak value is formed by subtraction of a second oscillator input voltage proportional to the input voltage from the upper peak value, and said oscillator includes:

a first comparator having a positive input receiving the first oscillator input voltage, a negative input at the level of the upper peak value, and an output;

a second comparator having a positive input at the level of the lower peak value, a negative input at the level of the first oscillator input voltage, and an output;

a flip-flop having a set input connected to the output of the first comparator, a reset input connected to the output of the second comparator, and an output connected to said pulse width modulator, and a transistor circuit being connected to the output of said flip-flop and discharging the capacitor with a current intensity proportional to the input voltage once the first oscillator input voltage has attained the upper peak value.

8. Circuit configuration according to claim 7, wherein said pulse width modulator switches on said switch once the oscillator signal has passed through a control threshold upon passage of the control edge, and switches off said switch once the oscillator signal has attained a peak value located at the end of the control edge.

9. Circuit configuration according to claim 8, wherein said flip-flop is a first flip-flop, and said pulse width modulator includes a third comparator having a positive input at the level of the first oscillator input voltage, a negative input at the level of the control threshold, and an output; a second, reset-dominant flip-flop having a set input connected to the output of said third comparator, a reset input connected to the output of said first flip-flop and an output; and a driver for said switch being connected between the output of said second flip-flop and said switch.

10. Circuit configuration according to claim 8, wherein the control threshold is derived from the secondary winding voltage.

11. Circuit configuration according to claim 9, including a demagnetization monitor preventing said switch from being switched on by outputting an enabling signal until said transformer is completely demagnetized in the blocking phase, the oscillator signal being stopped at the control threshold upon passage of the control edge if and as long as no enabling signal has been emitted.

12. Circuit configuration according to claim 11, including a first AND gate having an inverting input receiving the enabling signal of the demagnetization monitor, a non-inverting receiving the control threshold, and an output connected to the set input of said second reset-dominant flip-flop; and a first voltage regulator having a fourth comparator, a second AND gate and a second transistor circuit, said fourth comparator having a positive input at the level of the first oscillator input voltage, a negative input connected to the control threshold, and an output, said second AND gate having a first input connected to the output of said fourth comparator and a second input receiving the enabling signal, and an output, and said second transistor circuit being controlled by the output of the second AND gate for maintaining the first oscillator input voltage at the control threshold if and as long as no enabling signal is present.

13. Circuit configuration according to claim 12, wherein the oscillator signal is synchronized by means of a synchronizing pulse, and the oscillator signal is kept at its peak value located at the beginning of the control edge if and as long as the synchronizing signal is present.

14. Circuit configuration according to claim 13, including a third, reset-dominant flip-flop having a reset input receiving the synchronizing signal, a set input connected to the output of said first flip-flop, and an output; and a second voltage regulator having a fifth comparator, a third AND gate, and a third transistor circuit; said fifth comparator having a positive input at the level of the first oscillator input voltage, a negative input at the level of the peak value located at the beginning of the control edge, and an output; said third AND gate having a first input connected to the output of said fifth comparator, a second input connected to the output of said third, reset-dominant flip-flop, and an output; and said third transistor circuit being switched by the output of said third AND gate for keeping the first oscillator input voltage at the peak value located at the beginning of the control edge whenever a current pulse is present.

15. Circuit configuration according to claim 2, wherein the input voltage is a rectified and filtered mains voltage.

16. Circuit configuration according to claim 2, wherein the circuit configuration is a blocking oscillator converter switching power supply of a television set with digital signal processing or monitors.

17. Circuit configuration according to claim 2, wherein said switching transistor has a base current, said pulse width modulator controlling said switching transistor with a base current which is proportional to the collector current, the strength of the base current being determined by the signal derived from the control edge.

* * * * *